United States Patent [19]

Gathright et al.

[11] Patent Number: 4,624,041

[45] Date of Patent: Nov. 25, 1986

[54] SLEEVE BEARING PULLER

[75] Inventors: John B. Gathright; Grady C. Gathright, both of Smackover, Ark.

[73] Assignee: Gathright Puller, Inc., Smackover, Ark.

[21] Appl. No.: 789,620

[22] Filed: Oct. 21, 1985

[51] Int. Cl.[4] .......... B23P 19/04

[52] U.S. Cl. .......... 29/263

[58] Field of Search .......... 29/280, 263, 265, 255, 29/282; 72/393, 392, 370, 367; 269/48.1; 254/104

[56] References Cited

U.S. PATENT DOCUMENTS

| | | | |
|---|---|---|---|
| Re. 24626 | 4/1959 | Williams | 29/280 |
| 4,057,889 | 11/1977 | Ferguson | 29/280 |
| 4,184,665 | 1/1980 | Queen | 254/104 |

FOREIGN PATENT DOCUMENTS

| | | | |
|---|---|---|---|
| 1830 | of 1914 | United Kingdom | 29/263 |

*Primary Examiner*—Robert C. Watson

*Attorney, Agent, or Firm*—H. Mathews Garland

[57] ABSTRACT

A sleeve bearing puller for removing sleeve bearings such as camshaft bushings from engine cylinder blocks including a pair of expandable and contractable half cylinder shaped extractors having an outer end pulling flange and internal longitudinally spaced cam surfaces, guide pins between the extractors for guiding them in parallel relation between expanded and contracted positions, and expander mandrel between the extractors having longitudinally spaced cam surfaces for expanding the extractors in parallel relation in response to a pull on the mandrel, and a garter spring encircling the extractors holding the extractors on the expander mandrel.

8 Claims, 6 Drawing Figures

SLEEVE BEARING PULLER

BACKGROUND OF THE INVENTION

This invention relates to bearing pullers and more specifically relates to a puller for removing bushings or sleeve bearings from a bore in machinery such as a camshaft bushing bore in a diesel engine.

History of the Prior Art

Some engines, particularly diesel engines, have sleeve bearings which are extremely difficult to remove when servicing the engines. A particularly troublesome sleeve bearing is the rear camshaft bushing of certain diesel engines installed in trucks. The removal of this rear bushing is very time consuming and expensive because the truck must be taken into a shop where it is necessary to remove the engine or transmission in order to obtain access to the bushing. This procedure can require from eight to twelve hours labor. This, of course, is quite expensive from the repair standpoint as well as the down time of the truck. Tools for removal of a sleeve bearing or bushing positioned at such an inaccessable location in an engine are not known to be available. Prior art devices for removal of internal sleeves are however shown in the following U.S. Pat. Nos. 3,340,593, 4,295,260, 2,424,681, 3,403,434, 2,341,677, 2,085,529, 3,846,898, and 3,945,104. None of the devices shown in these patents, however, are the same structure as the present invention, are not as simple in construction and inexpensive to manufacture, and would not effectively pull a sleeve bearing such as the back camshaft bushing of an engine. For example, U.S. Pat. No. 2,424,681, shows a sleeve puller which, however, utilizes a piveted foot which must be canted space to insert such a puller to retrieve a rear cam shaft bushing. U.S. Pat. No. 3,340,593, shows a pair expandable fingers which may be inserted to pull an internal bear though rotation of the expander rod between the fingers is necessary and the fingers expand at outer ends only, which may not permit the proper grasp of a camshaft bushing in a remote location. U.S. Pat. No. 2,341,677, shows a substantially more complex sleeve puller which would be difficult to manipulate in a remote location.

SUMMARY OF THE INVENTION

It is a particularly important object of the invention to provide a new and improved sleeve puller.

It is another object of the invention to provide a sleeve puller which may be used to remove rear camshaft bushings in engines from remote, difficult to reach locations.

It is another object of the invention to provide a sleeve bearing puller which is simple in construction and inexpensive to manufacture.

It is another object of the invention to provide a sleeve bearing puller which is insertable into a remotely located sleeve and easily expanded by longitudinal motion only to grasp the sleeve.

In accordance with the invention there is provided a sleeve bearing puller for removing sleeve bearings from remote locations including a pair of sleeve extractors each having a pulling flange and mounted on an expander mandrel for laterial expansion and contraction in parallel relationship between a first contracted mode for insertion into a sleeve bearing, and a second expanded mode for gripping and pulling the bearing responsive to a pull on the mandrel.

BRIEF DESCRIPTION OF THE DRAWING

The novel features and advantages of the invention will be more fully understood from the following description of a preferred embodiment thereof read in conjunction with the accompanying drawings wherein.

DETAILED DESCRIPTION OF THE PREFERRED EMBODIMENT

Figure 1:
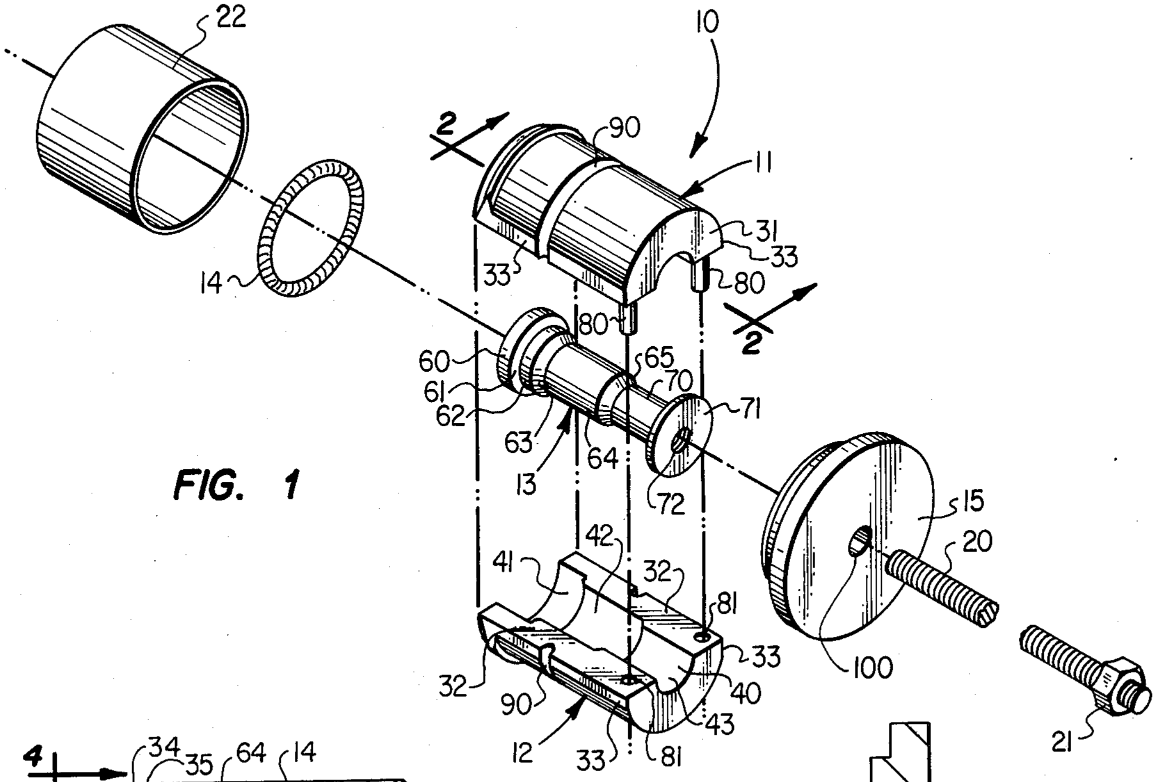
FIG. 1 is an exploded view in perspective showing the bearing puller and a sleeve bearing which may be removed with the puller.

Referring to FIG. 1, a bearing puller 10 includes a pair of half cylinder shaped sleeve extractors 11 and 12, an expander mandrel 13, a spring 14 for resiliently holding the extractors on the expander mandrel, a thrust plate 15, a pull rod 20, and a pull nut 21. The extractors 11 and 12 are moveable laterally in parallel relationship between a contracted insertion mode represented in FIGS. 2 and 4 and an expanded pulling mode shown in FIGS. 3 and 5. The extractors are shifted between the first and second modes by longitudinal motion only of the expander mandrel relative to the extractors. The first contracted mode is used for inserting the puller into a sleeve bearing such as the camshaft bushing 22 shown in the drawings.

Figure 2:
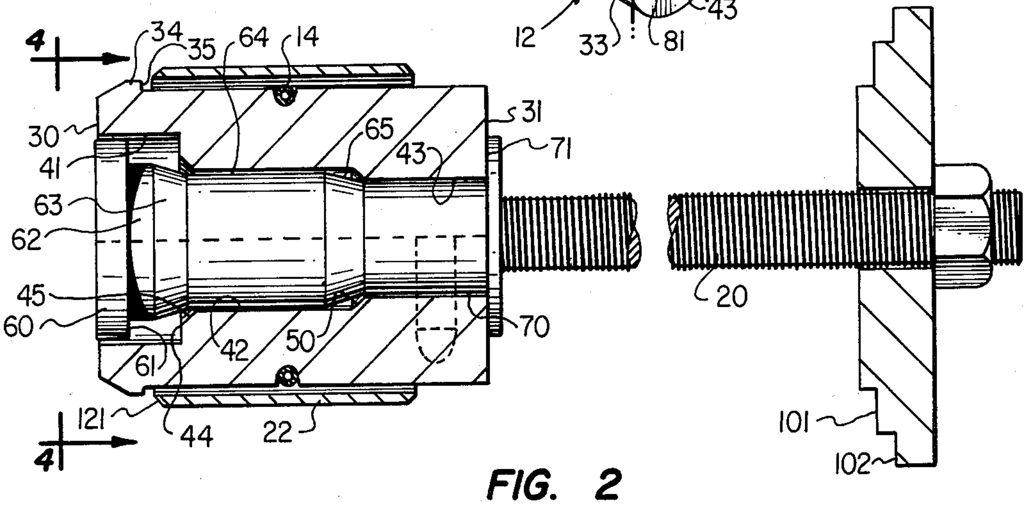
FIG. 2 is an enlarged longitudinal view in section and elevation of the assembled bearing puller inserted into the sleeve bearing as viewed along the line 2—2 of FIG. 1.
Figure 3:
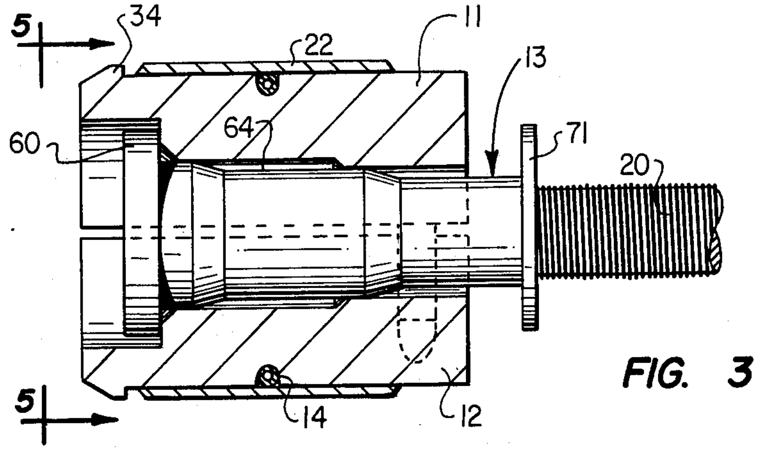
FIG. 3 is a longitudinal fragmentary view in section and elevation similar to FIG. 2 showing the sleeve extractors expanded within the sleeve bearing for removing the sleeve bearing.
Figure 4:
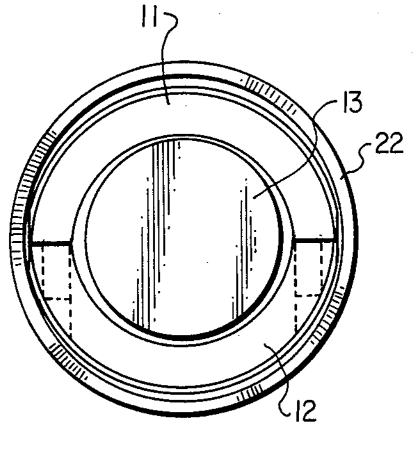
FIG. 4 is an end view of the bearing puller inserted into the sleeve bearing as seen along the line 4—4 of FIG. 2.
Figure 5:
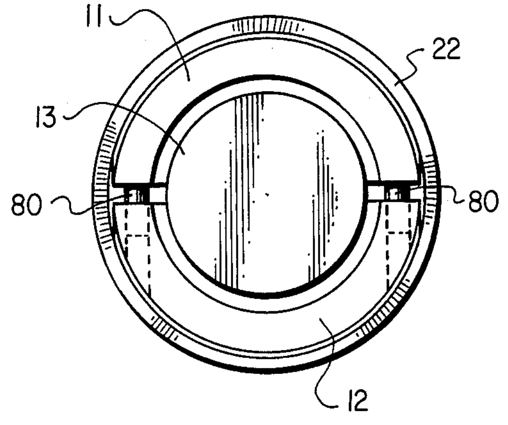
FIG. 5 is an end view of the expander sleeve extractors in the sleeve bearing as seen along the line 5—5 of FIG. 3.

Referring to FIGS. 1–3, the sleeve extractors 11 and 12 are identical, longitudinal, partial cylinders which are insertable into the sleeve 22 in the contracted mode of FIGS. 2 and 4 and fit snuggly against the inside surface of the sleeve bearing in the expanded mode of FIGS. 3 and 5. Each of the extractors 11 and 12 has opposite end faces 30 and 31 which lie in parallel planes perpendicular to the longitudinal axis of the extractor. The extractors have inside faces 32 which lie in a plane perpendicular to the end faces and parallel with the axis of the extractor. Each of the extractors 11 and 12 has opposite longitudinal side faces 33 which are parallel with each other and with the longitudinal axis of the extractor in planes perpendicular to the end faces 30 and 31 and to the inside faces 32. The distance between the side face 33 is less than the inside diameter of the sleeve bearing 22. Each of the extractors 11 and 12 has a peripheral end flange 34 providing a pulling shoulder 35 at the end of extractor defined by the end face 30. Each of the extractors is less than a half-cylinder shape sufficiently that when the extractors are contracted as in FIGS. 2 and 4, the diameter across the two extractors at the flanges 34 measured in a plane perpendicular to the inside faces 32 is less than the inside diameter of the sleeve bearing 22. The spacing between the side faces 33 and the maximum diameter of the two extractors at the flange 34 is controlled by the inside diameter of the sleeve 22 so that in the insertion mode the two extractors held together by the spring 14 readily are inserted through the sleeve bearing to the position represented in FIG. 2. The two extractors at the flange 34 must be able to pass fully through the bore of the sleeve bearing 22. This provides a somewhat eliptical shape to the coassembled extractors in the first insertion mode as shown in FIG. 4 and a circular shaped in the expanded pulling mode of FIG. 5 so that the body of the extractors fits tightly within the bore of the sleeve bearing 22 with the extractor cylindrical portions engaging the bore of the sleeve bearing, except along the flat side faces 33. Of course, the radial width of the flange 34 and thus the pulling shoulder 35 must be sufficient that when the extractors are in the second expanded pulling mode the pulling shoulder 35 fully engages an end face of the sleeve bearing 22 so that the pulling shoulder is capable of applying sufficient force on the sleeve bearing to remove the sleeve bearing. Each of the extractors 11 and 12 has a graduated bore portion 40 comprising: a first end portion 41, a second intermediate portion 42, and a third opposite end portion 43. The bore portions 41, 42, and 43 are cylindrical segments so that when the extractors are expanded as in FIGS. 3 and 5, each of the bore segments defines a cylindrical bore through the assembled extractors along the longitudinal axis of the assembly. Between the large bore portion 41 of the extractors and the smaller intermediate bore portion 42, each of the extractors has an internal pulling shoulder 44 and a tapered cam surface 45 which is between the pulling shoulder 44 and the bore portion 42. Further, each of the extractors 11 and 12 has a tapered internal cam surface 50 between the intermediate bore portion 42 and the smaller end bore portion 43. The expander mandrel 13 is a graduated cylindrical member having longitudinally spaced outside cylinderical and tapered cam surfaces which coact with the inside bore surfaces of the extractors 11 and 12 to permit the extractors to move inwardly to the contracted first mode insertion positions of FIG. 2 and expand the extractors to the second pulling mode positions of FIGS. 3 and 5. The mandrel 13 is provided with an end pulling flange 60 which has an inside annular pulling shoulder 61, a first cylindrical portion 62 which joins a tapered annular cam surface 63, an intermediate second cylindrical surface portion 64 adjoining a second annular tapered cam portion 65, and a third cylindrical end portion 70. The expander mandrel 13 also has stop flange 71 at the end defined by the surface 70 which limits how far the mandrel telescopes into the extractors. An internally threaded blind bore 72 is provided in the mandrel 13 along the mandrel axis for the pull rod 20. The diameter of the flange 60 on the expander mandrel is smaller than the effective diameter of the bore portions 41 in the extractors 11 and 12 so that the pulling flange readily fits within the extractors and the pulling shoulder 61 on the flange 60 is engageable with the pulling shoulder 44 in the extractors in the pulling mode of FIG. 3. The diameters of the various cylindrical portions of the expander mandrel are sized so that in the insertion mode of FIG. 2 the mandrel surface 64 fits within the extractor surface 42 and the mandrel surface 70 within the extractor surfaces 43. When the expander mandrel is in the pulling mode of FIG. 3 the mandrel surface 62 fits within the extractor surfaces 42 and the mandrel surface 64 fits within the extractor surfaces 43.

Referring to FIG. 1, the extractor 11 is provided with two laterally spaced guide pins 80 secured in the extractor and projecting in parallel relationship perpendicular to and inwardly from the inside faces 32 of the extractor. The extractor 12 has a pair of blind guide pin holes 81 drilled along axes perpendicular to the inside faces 32 of the extractor spaced laterally and longitudinally to receive the guide pins 80 of the extractor 11. The coaction between the guide pins 80 in the extractor 11 and the guide holes 81 in the extractor 12 hold the two extractors in longitudinal alignment and aid in holding them in parallel relationship with each other as the extractors contract and expand between the insertion mode of FIG. 2 and pulling mode of FIG. 3. Each of the extractors 11 and 12 is provided with an external annular groove 90 for the spring 14 to hold the extractors around the expander mandrel biasing the extractors inwardly toward the mandrel and permitting the extractors to be expanded to the pulling mode of FIG. 3.

As indicated in FIGS. 1 and 2, the thrust plate 15 is a circular, graduated member having a smooth central bore 100 larger than the diameter of the rod 20 so that the rod freely slides through the thrust collar. The thrust plate has concentric external annular thrust surfaces 101 and 102 so that the plate will fit at least two camshaft bushing bore sizes. The pull rod 20 is threaded over the entire length of the rod so that a first end is threaded into the blind bore 72 of the expander mandrel 13 and the nut 21 is threaded on the opposite outer end of the rod to apply a pulling force to the rod against the thrust plate.

Figure 6:
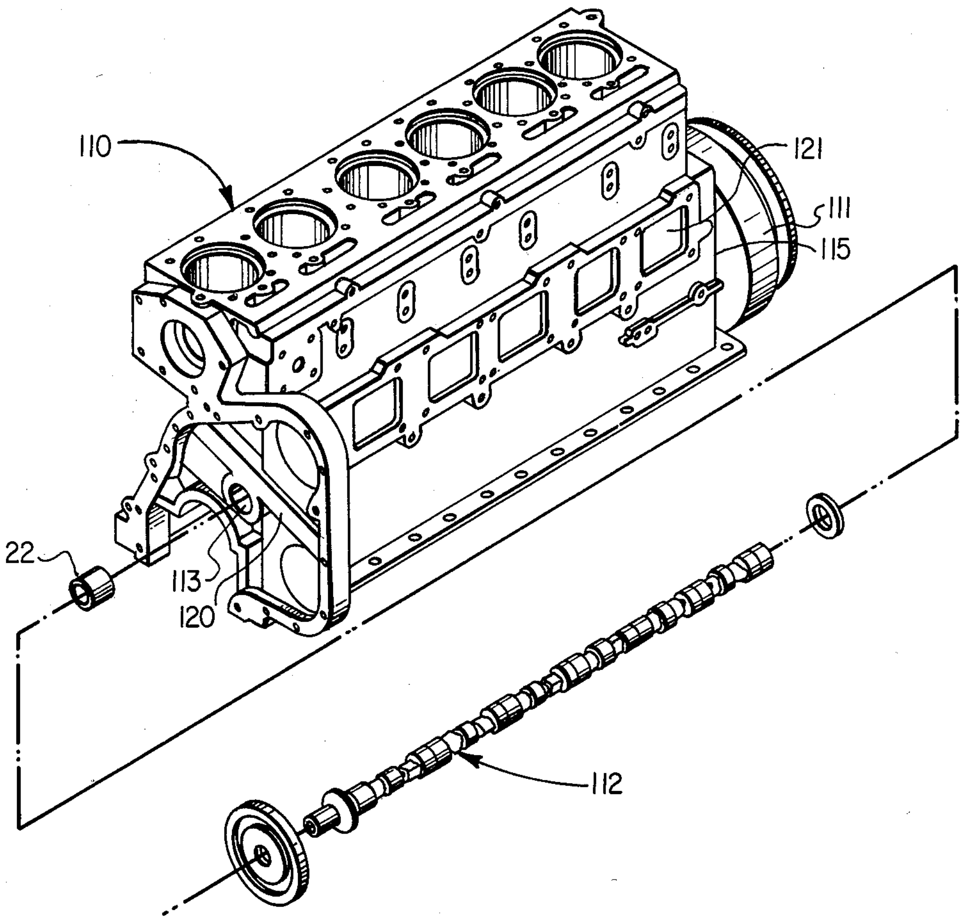
FIG. 6 is an exploded perspective view of a diesel engine block, the camshaft of the engine, and the rear cam shaft bushing of the engine.

A particularly important application of the sleeve bearing puller of the invention is the removal of the rear camshaft bushing which is a sleeve bearing from the block of a diesel engine mounted in a truck. Referring to FIG. 6, a diesel engine cylinder block is shown with a transmission 111 installed on the block. While the cylinder block only is shown for simplicity of illustration, it is to be understood that the engine may be in a truck connected with the transmission of the truck, and a particular advantage of the present invention is that the desired rear cam bearing may be removed from the cylinder block without taking the engine out of the truck or disconnecting the transmission from the engine. The engine has a camshaft 112 which fits in a camshaft bushing bore 113. The particular rear camshaft bushing 114, shown removed in FIG. 6, actually fits within the camshaft bore to support the rear end of the camshaft at the rear end 115 of the cylinder block beneath a rear seal and backing plate and covered by the transmission housing. The sleeve bearing puller of the invention is used to pull and remove the camshaft bushing 114 without disassembly of the transmission from the cylinder block.

For operation of the sleeve bearing puller 10 to remove the camshaft bushing 22 from the cylinder block 110, the component parts of the bearing puller shown in FIG. 1 are assembled as shown in FIGS. 2 and 4. The extractors 11 and 12 are fitted together on the expander mandrel 13 with the guide pins 80 in the extractor 11 inserted into the guide pins holes 81 in the extractor 12. The mandrel 13 is aligned longitudinally in the extractors so that the stop flange 71 on the mandrel engages the end faces 31 of the extractors. At this position of the mandrel in the extractors, the extractors fit together, as shown in FIGS. 2 and 4, with the inside faces 32 of the extractors in contact. The spring 14 is stretched around the extractors and placed in the external grooves 90 to resiliently hold the extractors together around the expander mandrel. With the extractors pressed together, the assembled extractors have a cross section which is substantially elitical as shown in FIG. 4, so that the maximum distance between the outer surfaces of the two extractors at the pull flange 34 measured in a plane coincident with the longitudinal axis of the assembly perpendicular to the surfaces 32 is less than the inside diameter of the camshaft bushing 22 to be removed with the puller. As previously discussed, the lateral dimension of the extractors between the side faces 33 also is less than the inside diameter of the bushing 22. The spring 14 reciliently holds the extractors tightly together on the expander mandrel so long as the mandrel remains in the longitudinal position shown in FIG. 2 relative to the extractors. A first end of the threaded rod 20 is threaded into the bore 72 of the mandrel 13. The thrust plate 15 is placed on the outer end of the rod 20 and the nut 21 is screwed on the outer end of the rod following the thrust plate. The assembled puller is oriented so that preferably the pins 80 extending between the extractors are aligned vertically. The assembled extractors are then inserted into camshaft bushing bore 113 and manipulated through the bore until the compressed extractors in the contracted insertion mode of FIG. 2 are inserted through the bushing 22. The thrust plate 15 fits against the front face 120 of the cylinder block around the bore 113 to provide a pulling surface when the nut 21 is turned on the rod 20. The assembled extractors are inserted through the bushing until the pulling flange 34 on the extractors is beyond the back or inside edge face 121 of the bushing 22. The nut 21 is then turned pulling the rod through the thrust plate 15 applying a pulling force to the rod so that the pulling shoulder 35 particularly on the lower extractor engages the end edge 121 of the bushing 22. Engagement between the pulling shoulder 35 and the bushing end edge 121 tends to hold the extractors against movement in the bushing while the continued force through the rod 20 on the expander mandrel 13 causes the cam surfaces 63 and 65 on the expander mandrel to engage the internal cam surfaces 45 and 50, respectively, in the extractors as will be apparent from FIG. 2. The camming action of both of the mandrel surfaces 63 and 65 forces both ends of each of the extractors 11 and 12 outwardly expanding the extractors against the spring 14 within the bore of the bushing 22 to the pulling positions illustrated in FIGS. 3 and 5. The mandrel surface 62 is within the central bore portion 42 of the extractors and the mandrel surface 64 is within the bore surfaces 43 of the extractors. The simultaneous camming action of the mandrel surfaces 63 and 65 acting on the extractor surfaces 45 and 50 moved the extractors apart in parallel relation so that full engagement of the cylindrical surface portions on both of the extractors is obtained against the inside bore surface of the bushing 22. Continued rotation of the nut 21 on the rod 20 pulls the rod outwardly because the nut 21 engages the outer face of the thrust plate 15. The nut 21 is rotated until the bushing 22 is fully extracted from its position at the inward end of the bushing bore 113. After the bushing is extracted, the mandrel 13 may be pushed back to the position of FIG. 2 and the extractor assembly removed from the bushing.

Other techniques for expanding the extractors from the position of FIG. 2 to that of FIG. 3 may be used after the extractor assembly is inserted to the position of FIG. 2. With the thrust plate 15 removed from the rod or backed off sufficiently to provide access to the opening into the camshaft bushing bore 113, a rod of similar size and length to the rod 20 may be inserted through the bushing bore along side the rod 20 with one end of the rod held against the end face 31 of one of the extractors 11 or 12. The rod 20 is then be pulled outwardly while the extractors are held against movement so that the mandrel expands the extractors. In a still further procedure, one of the side opening such as the side opening 121 in the cylinder block may provide access to the space at the inward ends of the bushing to be removed and the inserted extractors 11 and 12. The mechanic's finger or a screw driver may be manipulated through the window 121 holding the end face 31 of one of the extractors as the rod 20 is lightly pulled to expand the extractors. Relatively little force is required for expansion of the extractors to the positions of FIGS. 3 and 5.

In the event that a problem is encountered in engaging the shoulders 35 on the extractors with the end edge 121 of the bushing 22, the expansion of the extractors within the bore of the bushing often will wedge the extractors sufficiently tightly that the bushing may be removed. It will be recognized that with the pulling flange 34 on the extractors within the bushing bore the extractors cannot fully expand and thus in such condition the mandrel cam surfaces 63 and 65 will remain engaged with the extractors cam surfaces 45 and 50 so that with the extractors wedged in the bore of the bushing continued pulling on the rod tends to wedge the extractor more tightly providing a better grip within the bushing for removing the bushing.

It will now will be seen that a new and improved sleeve bearing puller has been described and illustrated which is simple in construction and has a minimum number of parts. The puller effectively removes sleeve bearing such as camshaft bushings from remote locations in engines. It will be recognized that the parts comprising the puller may be made in a number of different sizes to provide a wide range of applications. A single expander mandrel 13 may be used with a variety of sets of extractors 11 and 12 having different dimensions along the outer surfaces of the extractors while retaining the same dimensions on the inner surfaces so that they fit a single expander mandrel.

What is claimed is:

1. A sleeve bearing puller comprising:
   a plurality of expandable and contractable sleeve extractors each having an external sleeve pulling flange and internal longitudinally spaced tapered cam surfaces and cylindrical holding surfaces;
   an expander mandrel within said extractors for longitudinal movement therein, said mandrel having a pulling shoulder and longitudinally spaced tapered cam surfaces and cylindrical holding surfaces engageable with said internal surfaces in said extractors for expanding and holding said extractors in lateral parallel spaced relation for engaging and pulling a sleeve bearing; and
   a resilient retainer around said extractors holding said extractors on said mandrel for expansion and contraction responsive to longitudinal movement of said mandrel within said extractors.

2. A sleeve bearing puller in accordance with claim 1 including guide pins between said extractors for holding said extractors in longitudinal alignment while permitting said extractors to expand and contract on said mandrel.

3. A sleeve bearing puller in accordance with claim 2 comprising two of said extractors each comprising a partial cylinder incompassing less than 180 degrees around the longitudinal axis of said partial cylinder, said internal holding surfaces in said extractors are cylindrical surface portions, and said external holding surfaces on said expander mandrel are cylindrical surface portions sized to fully engage said cylindrical surface portions within said extractors.

4. A sleeve bearing puller in accordance with claim 3 wherein said sleeve extractors each is provided with a external annular groove and said resilient retainer is a spring fitting in said groove to hold said extractors around said expander mandrel.

5. A sleeve bearing puller in accordance with claim 4 including a stop flange on said expander mandrel to limit the longitudinal movement of said mandrel into said sleeve extractor to a first position at which said extractors are contracted around said mandrel.

6. A sleeve bearing puller in accordance with claim 5 including a pull rod engageable along one end portion with said expander mandrel for pulling said mandrel relative said extractors to expand said extractors.

7. A sleeve bearing puller in accordance with claim 6 including a thrust plate on said pull rod and a thrust nut on said rod outward of said thrust plate for applying a pulling force to said rod to expand said extractors.

8. A sleeve bearing puller comprising:

two sleeve extractors supported in longitudinally aligned relationship and adapted for lateral expansion and contraction between a first contracted insertion mode at which said extractors are insertable into a sleeve bearing and a second expanded pulling mode at which said extractors are spaced apart in parallel relation for engaging the inner wall and end edge of said sleeve bearing;

each of said extractors being a half cylinder shaped member incompassing less than 180 degrees around the longitudinal axis of said member and having a uniform diameter outer surface and an end external annular pulling flange sized to fit the inside surface of a sleeve valve bearing and engage said end edge of said bearing when said extractors are expanded, and said extractors having longitudinal inside faces lying in a plane parallel with the longitudinal axis of said extractors, said inside faces on said extractors being engageable one with the other when said extractors are in said first contracted insertion mode at which the maximum diameter across the two extractors along a line perpendicular to the plane of said inside surfaces is less than the inside diameter of said sleeve bearing to permit said extractors to be inserted through said sleeve bearing;

said extractors each having longitudinal side faces spaced apart less than the inside diameter of said sleeve bearing;

said extractors having a graduated cylindrical bore defined by a first large bore portion opening through one end of said extractors extending inwardly to a pulling shoulder surface perpendicular to said first bore portion, a second smaller intermediate bore portion, and a third still smaller opposite end bore portion;

said extractors having an external annular groove for a resilient member encircling said extractors and holding said extractors together;

one of said extractors having laterally spaced guide pins projecting from said inside face perpendicular to said inside face and the other of said extractors having laterally spaced guide pin holes opening through said inside face for receiving said guide pins to hold said extractors in longitudinal alignment and permit said extractors to expand and contract laterally;

an expander mandrel between said extractors, moveable longitudinally relative to said extractors, said expander mandrel being a graduated cylindrical member having an external annular pulling flange at a first end thereof sized to fit within said first bore portion of said extractors, a first diameter portion sized to fit said second bore portion of said extractors, a second intermediate cylindrical portion spaced from said first cylindrical portion and sized to fit in said third bore portion of said extractors when said extractors are expanded, a first inwardly sloping cam surface between said first and second cylindrical portions sloping inwardly away from said pulling flange, a third cylindrical portion spaced from said second cylindrical portion and smaller than said second cylindrical portion, a second cam surface between said second cylindrical portion and said third cylindrical portion sloping inwardly away from said pulling flange, said first and second cam surfaces coacting with bore surfaces of said extractors to expand said extractors in parallal spaced relation to engage the surface of said bore of said sleeve bearing, and an external annular stop flange on the end of said mandrel opposite said pulling flange for engaging second opposite ends of said extractors to limit the movement of said mandrel into said extractors to a first position at which said extractors are contracted inwardly around said mandrel, said mandrel having an internally threaded blind bore along the axis thereof from the end of said mandrel opposite said pulling flange;

a threaded pulling rod engageable at a first end in said threaded blind bore of said mandrel for applying a pulling force to said mandrel to expand said extractors;

a thrust plate engageable on said pulling rod to provide a pulling surface on a member having a bore in which said sleeve bearing puller is inserted;

a nut adapted to thread on the outer opposite end of said pulling rod to rotate on said rod to apply a pulling force on said rod as said nut is turned on said rod against said thrust plate; and a resilient member encircling said extractors in said external groove around said extractors for biasing said extractors toward each other on said mandrel and permitting said extractors to move between said first contracted mode and said second expanded pulling mode.

* * * * *